United States Patent [19]
Billström

[11] Patent Number: 5,983,101
[45] Date of Patent: Nov. 9, 1999

[54] POINT TO MULTIPOINT RADIO ACCESS SYSTEM

[75] Inventor: Jan-Olof Billström, Solna, Sweden

[73] Assignee: Telefonaktiebolaget LM Ericsson, Stockholm, Sweden

[21] Appl. No.: 08/910,147

[22] Filed: Aug. 13, 1997

Related U.S. Application Data

[60] Provisional application No. 60/031,612, Nov. 26, 1996, and provisional application No. 60/031,536, Dec. 2, 1996.

[51] Int. Cl.$^6$ .................................................. H04Q 7/20
[52] U.S. Cl. ........................ 455/426; 455/522; 455/69; 455/552; 455/454
[58] Field of Search .................................. 455/422, 426, 455/450, 452, 522, 69, 552, 553, 702, 63, 454, 509

[56] References Cited

U.S. PATENT DOCUMENTS

| | | |
|---|---|---|
| 5,235,633 | 8/1993 | Dennison et al. . |
| 5,305,467 | 4/1994 | Herndon et al. . |
| 5,442,805 | 8/1995 | Sagers et al. . |
| 5,448,754 | 9/1995 | Ho et al. . |
| 5,491,832 | 2/1996 | Malkamaki et al. ..................... 455/552 |
| 5,539,730 | 7/1996 | Dent . |
| 5,559,790 | 9/1996 | Yano et al. . |
| 5,566,165 | 10/1996 | Sawahashi et al. . |
| 5,655,003 | 8/1997 | Erving et al. ........................... 455/418 |

FOREIGN PATENT DOCUMENTS

WO 95/25409  9/1995  WIPO .
WO 97/13388  4/1997  WIPO .

OTHER PUBLICATIONS

A. Bollman, et al, "Link Capacity and Cellular Planning Aspects for a Point to Multipoint Fixed Radio Access System", European Conference on Radio Relay Systems, Bologna, Italy, 1996, pp. 1–7.

S. Sampei, et al, "Adaptive Modulation/TDMA Scheme for Personal Multi–Media Communication Systems", Proceedings of the Global Telecommunications Conference (Globecom), San Francisco, Nov. 28–Dec. 2, 1994, vol. 2, Nov. 28, 1994, Institute of Electrical and Electronics Engineers, pp. 989–993.

S. Vadgama, "Adaptive Bit Rate Transmission for Personal Communications", Proceedings of the Nordic Seminar on Digital Land Mobile Radio Communications (DMR), Oslo, Jun. 26–28, 1990, No. Seminar 4, Jun. 26, 1990, General Directorate of Posts and Telecommunications, Finland, pp. 1–9.

Primary Examiner—Nguyen Vo
Attorney, Agent, or Firm—Nixon & Vanderhye, P.C.

[57] ABSTRACT

Link characteristics including modulation type are allocated to radio links in a point to multipoint system. The method allows for various modulation types, and takes into consideration the required coverage range, the minimum bandwidth requirement, and the foreseen interference situation.

6 Claims, 6 Drawing Sheets

Fig. 1
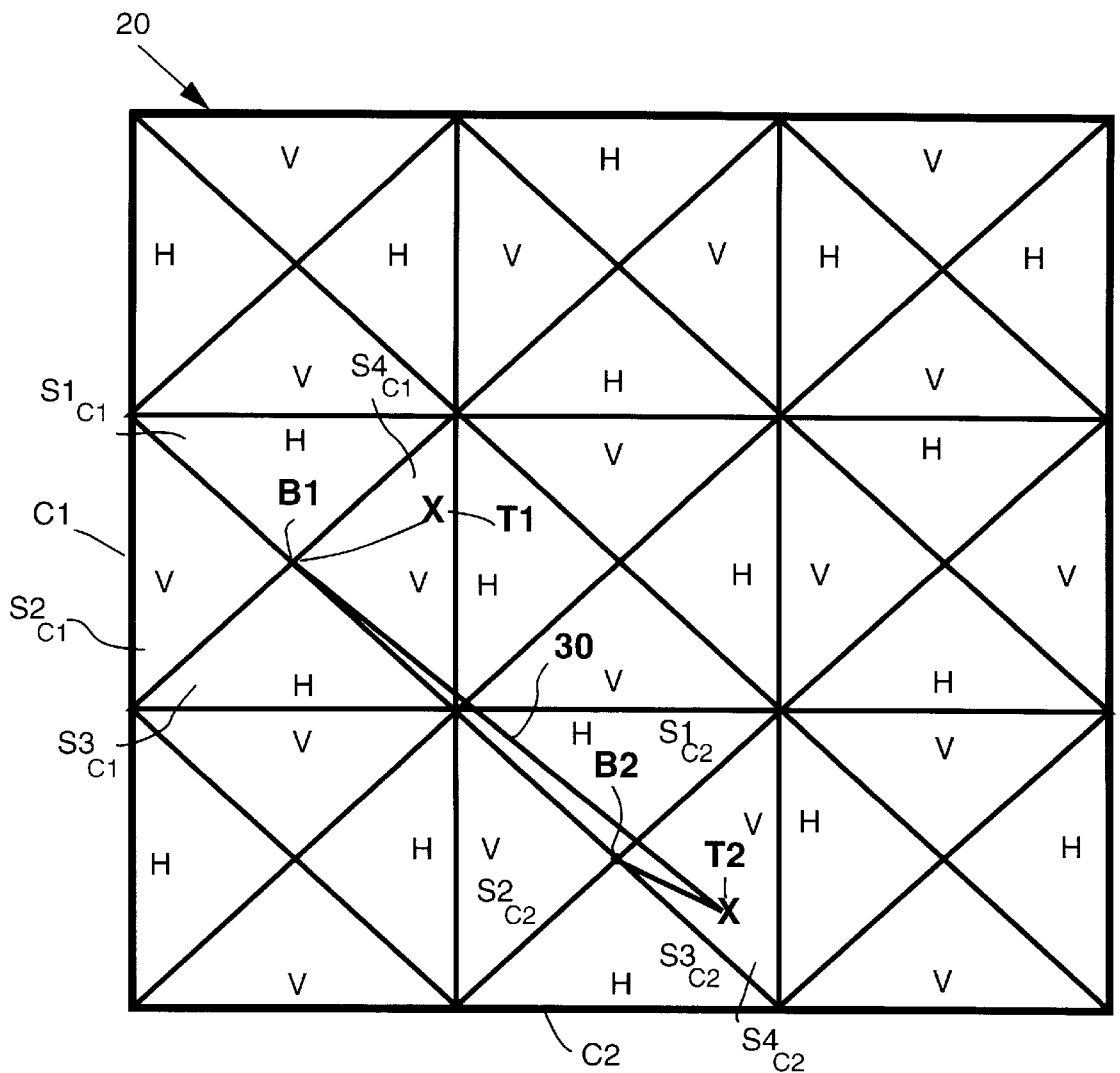
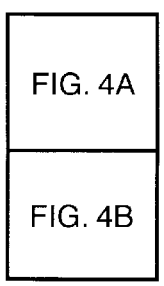
Fig. 4

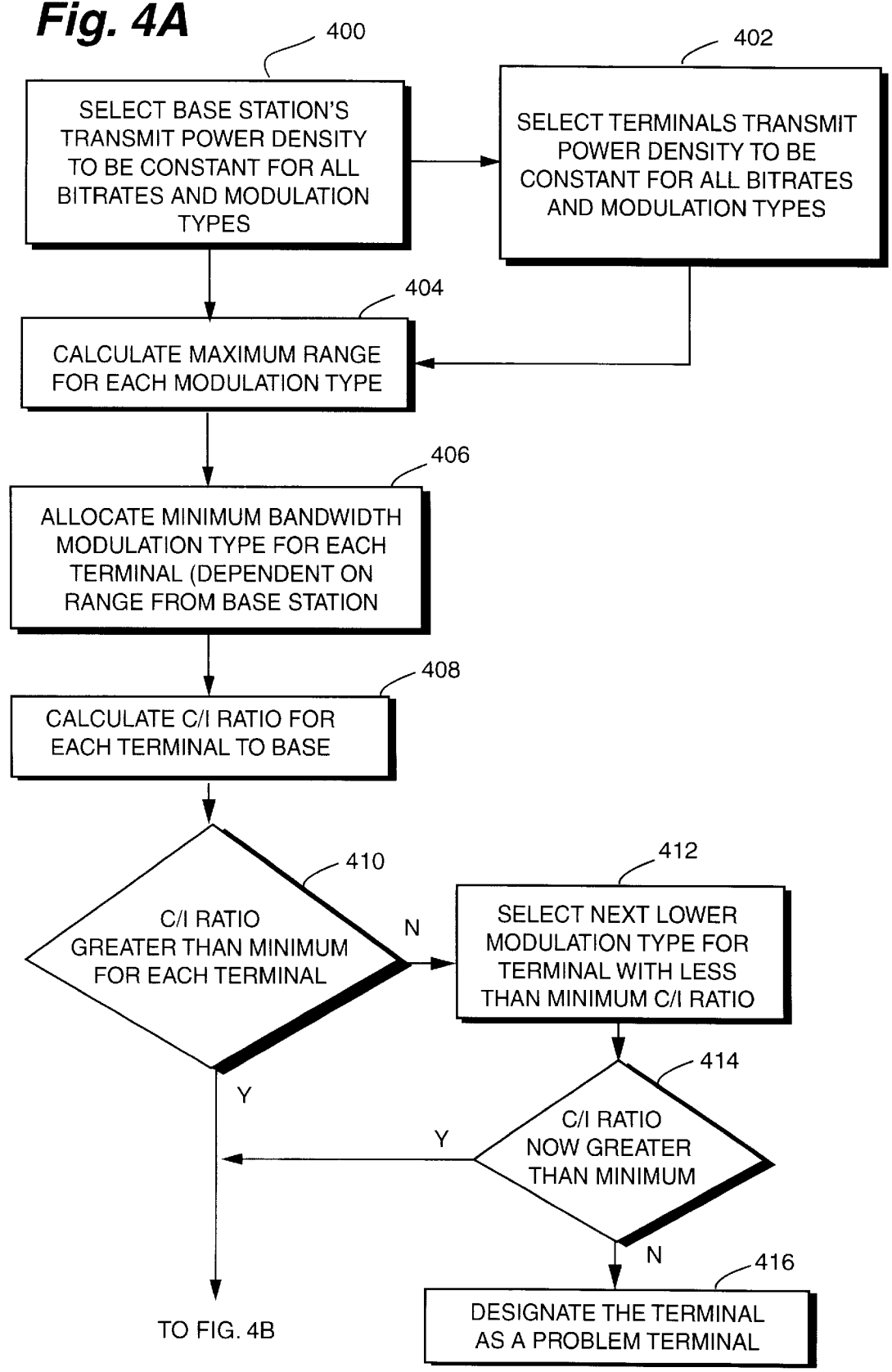

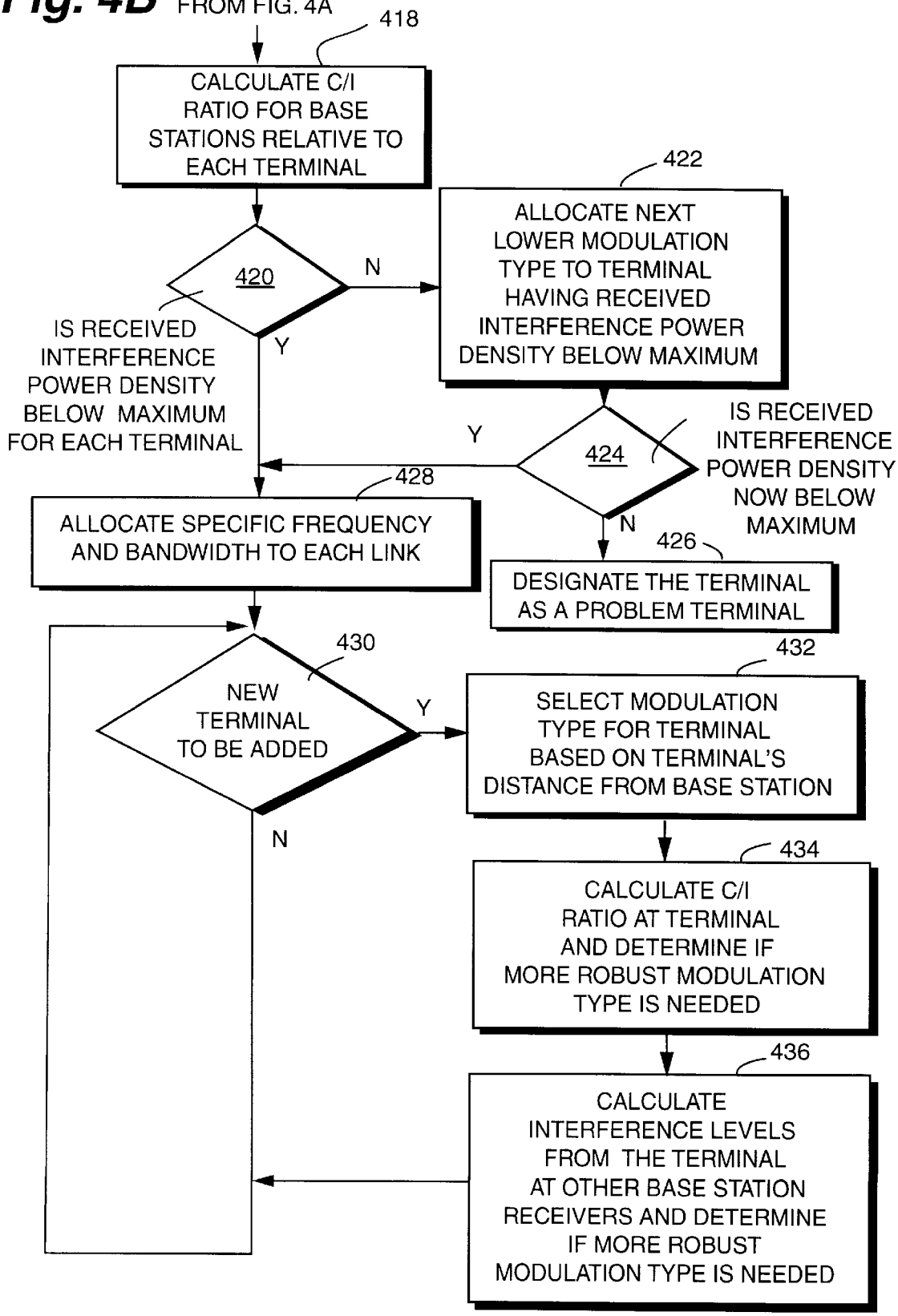

POINT TO MULTIPOINT RADIO ACCESS SYSTEM

This application claims the priority and benefit of the following U.S. Provisional Applications, both of which are incorporated herein by reference: Ser. No. 60/031,612 filed Nov. 26, 1996 and Ser. No. 60/031,536 filed Dec. 2, 1996.

BACKGROUND

1. Field of Invention

This invention pertains to a point to multipoint radio access system. The invention particularly pertains to the configuration of such system which utilizes a number of different modulation methods, the modulation methods being distinguishable with regard to the bandwidth efficiency but also with regard to the coverage range and the interference immunity.

2. Related Art and Other Considerations

Radio access methods have become frequently used to enable the rapid and economic implementation of the access network in modern telecommunication networks. Most known solutions up to date are based on conventional mobile cellular techniques, where the subscribers are fixed instead of mobile. One disadvantage of using cellular techniques for the access network is that the radio spectrum is limited and the implication of this is that these systems normally have a too limited capacity, especially in cities.

Recently a new point to multi point system has been suggested that uses microwave links between a central base station and subscriber terminals. The central base station uses normally 45 or 90 degree sector antennas and the terminals directive antennas pointing towards the base station.

In the suggested system, frequency reuse can be very effective by the use of alternating vertical and horizontal polarizations for the links in adjacent sectors. Also, the line of sight radio links lends themselves to high quality connections, the capacity of which can be adapted individually to different capacities (bitrates).

To further improve on the frequency economy of this system, it has been suggested to use a number of different modulation types for the links. The highest order of modulation requires minimum bandwidth for a given bitrate but has also the minimum range and is most sensitive for interferences from other links. The lowest order of modulation is the most robust. It has the longest coverage range and is also the least sensitive to interferences from other links.

The problem in this kind of system is then to select for each link the most suitable modulation, considering bandwidth economy, coverage range and the foreseen interference situation.

A system of this kind is described in a paper entitled "Link Capacity and Cellular Planning Aspects of a Point to Point Fixed Radio Access System", by A Bollmann, D. Chicon, and M Glauner, European conference on Radio Relay Systems 1996, Bologna, Italy. However heretofore there has not been a clear cut procedure for arriving to a suitable strategy to allocate suitable modulation types and bandwidth to each terminal in the system.

What is needed, therefore, is a system which enables a proper choice of a modulation type considering bandwidth efficiency, coverage range and the interference situation.

SUMMARY

A method is provided for allocating radio link characteristics in a point to multipoint radio access system. The point to multipoint radio access system comprising a number of base stations including a selected base station connected by a plurality of radio links to a corresponding plurality of subscriber terminals located within respective coverage areas of the selected base station. At least some of the plurality of radio links are within a same frequency band.

In accordance with the method, a base station power density is selected for the selected base station. The base station power density, for each of a plurality of modulation types, is constant for all bitrates. Similarly, for each of the plurality of subscriber terminals located within the coverage area of the selected base station, a terminal power density is selected. The terminal power density, for each of the plurality of modulation types, is constant for all bitrates. A maximum range is then determined for each of the plurality of modulation types. Then, for each of the plurality of subscriber terminals, a modulation type is allocated to the corresponding radio link dependent upon range from the selected base station. A determination is then made, for each of the plurality of subscriber terminals, whether at the subscriber terminal there is an acceptable signal quality. If not, a next lower modulation type is allocated to the radio link corresponding to the subscriber terminal which does not have the acceptable signal quality.

After the foregoing has occurred with respect to the subscriber terminals, a determination is made at the selected base station whether there is an acceptable signal quality with respect to each of the plurality of subscriber terminals. If not, the radio link corresponding to the subscriber terminal having unacceptable signal quality is allocated a next lower modulation type. Thereafter, frequencies and bandwidth are allocated to each of the plurality of radio links.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is schematic view of a microwave coverage network according to an embodiment of the invention.

FIG. 4 is a schematic view depicting the relationship of FIG. 4A and FIG. 4B.

FIG. 4A and FIG. 4B are flowcharts showing steps executed by a network planning processor according to an embodiment of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

FIG. 1 shows a microwave coverage network 20. Network 20 includes a regular pattern of base station sites and the corresponding cell or coverage area for each base station site. In FIG. 1, the cell or coverage area for each base station site is shown as a square, with a base station site being located at the center of the square (i.e., the center of the cell). For example, base station site B1 is centrally located in its cell C1 and base station site B2 is centrally located in its cell C2.

In the illustrated embodiment, each cell C comprises four triangular sectors. For example, cell C1 comprises sectors $S1_{C1}$, $S2_{C1}$, $S3_{C1}$, and $S4_{C1}$ and cell C2 comprises sectors $S1_{C2}$, $S2_{C2}$, $S3_{C2}$, and $S4_{C2}$.

Figure 1A:
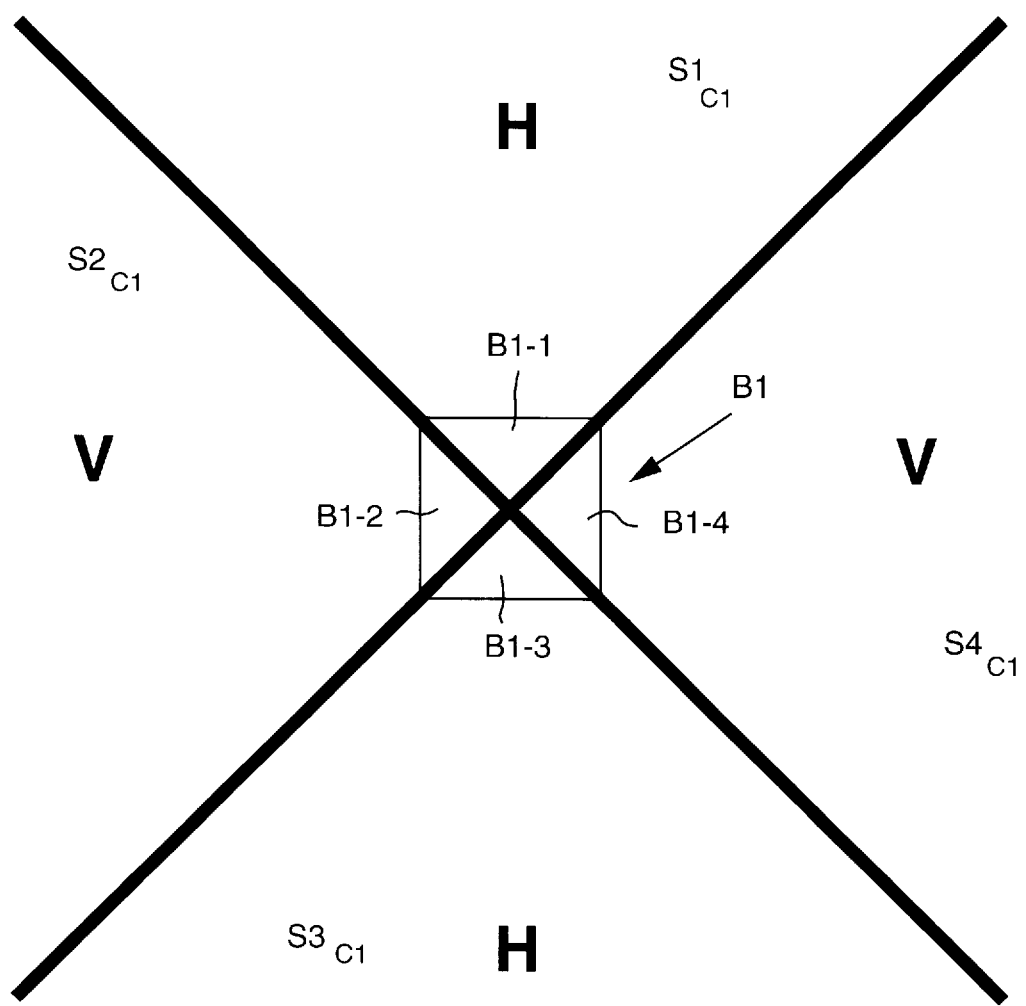
FIG. 1A is an enlarged schematic view of a portion of a coverage area served by a base station site of the network of FIG. 1.

FIG. 1A shows an enlargement of the center of cell C1 served by base station site B1. As seen in FIG. 1A, each base station site, such as base station site B1, includes four base stations (base stations B1-1, B1-2, B1-3, and B1-4 being shown as included in base station site B1 in FIG. 1A).

As shown both in FIG. 1 and FIG. 1A, alternating sectors S of a cell C have differing polarizations. That is, directly adjacent sectors receive transmissions in orthogonal polarizations to obtain decoupling in the overlap regions of the antenna patterns. For example, in cell C1 sectors $S1_{C1}$ and $S3_{C1}$ have horizontal polarization (as indicated by the letter "H") while sectors $S2_{C1}$ and $S4_{C1}$ have vertical polarization (as indicated by the letter "V").

In FIG. 1, two terminals T1 and T2 are shown. Terminal T1 is located in sector $S4_{C1}$, which is served by base station B1-4; T2 is located in sector $S4_{C2}$ which is served by base station B2-4. Terminals T1 and T2 are thus served by base stations which use the same polarizations.

In the particular configuration shown in FIG. 1, base stations B1, B2 have approximately 90 degree wide antennas. Terminals T1 and T2, on the other hand, have much smaller antenna beamwidths, typically 4–8 degrees. Although only two terminals T1 and T2 are illustrated in FIG. 1, it should be understood that many terminals typically reside in each sector S. Terminals are located at premises of customers, with each terminal being connected by lines (e.g., POTS or ISDN lines) to many telephone subscribers. Each terminal is dedicated and adjusted to one base station (e.g., terminal T1 is dedicated to base station B1-4).

Although there are several terminals within each sector, for a given sector each terminal T is allocated its individual frequency from a range of frequencies available in that sector. It can occur that the same frequency is being utilized both in sector $S4_{C1}$ and $S4_{C2}$. Thus, if terminals T1 and T2 were assigned the same frequency, a potential interference problem would arise. In this regard, a signal transmitted on a frequency f1 to terminal T1 from base station B1-4 at site B1 would, due to the wide antenna angle of base station B1-4, also hit the terminal T2 as indicated by line 30. If terminal T2 is also using frequency f1, interference would result. Thus, base station B1-4 could cause interference at terminal T2.

Likewise, terminal T2 could cause interference in base station B1-4. In this regard, terminal T2 has a narrow antenna beam which is directed towards its own base station B2-4. Normally the signal directed from terminal T2 to base station B2-4 would not hit the base station B1. However, if terminal T2 is more or less in line with both base station B2-4 as well as with base station B1-4 in the manner shown in FIG. 1, interference may arise. In this situation, the antenna of terminal T2 cannot discriminate between base station B2-4 and base station B1-4, and interference results.

It should be understood the use of four sectors S per cell as illustrated in FIG. 1 is merely to serve as an example. Whereas FIG. 1 illustrates each cell C sector at ninety degrees in view of the particular antennae employed, the cells can be sectored at other angles (e.g., forty five degree or fifteen degree angles) in accordance with the angles of the antennae chosen for the base stations.

The person skilled in the art will appreciate that the wide angle sectored base station antennae have a lower gain than the highly directive terminal antennae (which have a smaller beam). For example, an antenna at a terminal T may have an eight degree main beam with high antenna gain (e.g., 22 dB at 10 Ghz).

Figure 2:
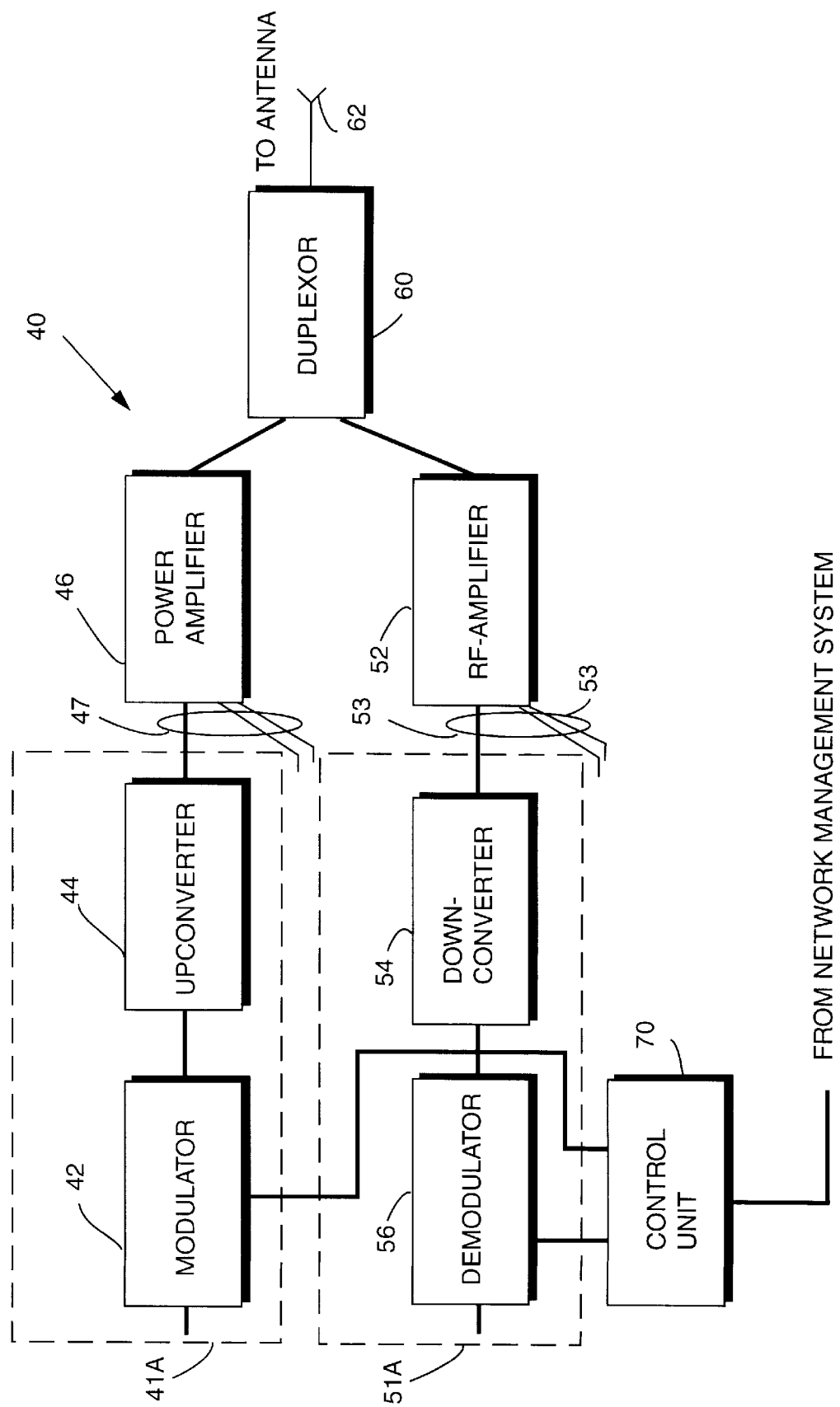
FIG. 2 is a schematic view of a base station according to an embodiment of the invention.

FIG. 2 shows a block diagram of a base station 40 (base station 40 being representative, for example, of base stations B1-4 and B2-4 discussed above). Base station 40 includes in its transmitter part a plurality of transmission channels 41, one such channel 41A being fully shown in FIG. 2. Each channel 41 has a modulator 42 and an upconverter 44 to convert the signals to RF-frequency. All transmission channels 41 are connected to power amplifier 46 as indicated by lines 47. Base station 40 also has a receiver part or receiver side having receiver channels 51, only channel 51A being fully illustrated in FIG. 2. All receiver channels 51 share a common RF-amplifier 52. Amplifier 52 is connected by lines 53 to each receiver channel 51. Each receiver channel 51 includes a down converter 54 and a demodulator 56. Duplexer 60 of base station 40 combines the transmitter and the receiver to a common antenna 62. The modulator 42 and demodulator 56 of each channel (commonly known as a modem) are controlled by a control unit 70. Control unit 70 connects to all transmission and receive channels. Control unit 70 sets the basic link parameters for the modem, i.e. modulation type, transmit power density, and bitrate. In a DBA (Dynamic Bandwidth Allocation) mode, control unit 70 also makes bandwidth allocations to the individual terminals on a momentary basis.

Figure 3:
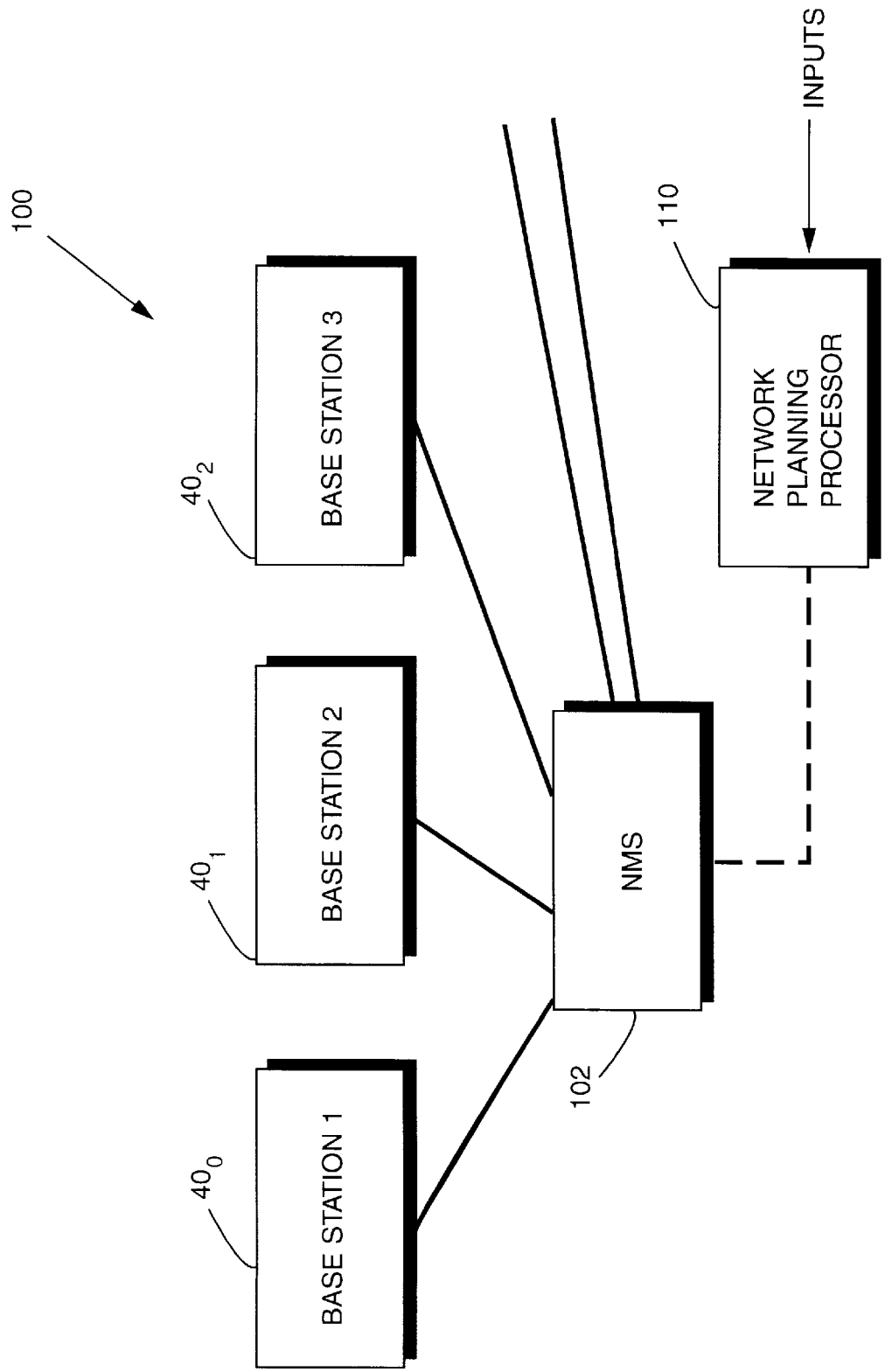
FIG. 3 is a schematic view of a base station network according to an embodiment of the invention.

FIG. 3 shows an overview of a base station network 100. A number of base stations $40_0$, $40_1$, $40_2$, etc. are connected to a Network Management System (NMS) 102. In particular, control units 70 of the plurality of base stations 40 are connected to Network Management System (NMS) 102.

Network Management System (NMS) 102 is, in turn, connected to a network planning processor (NPP) 110. Network planning processor (NPP) 110 can take various forms, such as a stand alone personal computer (PC). Operations and calculations performed by NPP 110 are described in more detail below. Results and outputs from Network planning processor 110 are transmitted to Network management system 102. The output operations from Network planning processor 110 to Network management system 102 can take the form of a simple file transfer. Inputs to Network management system 102 include the allowed modulation types for each terminal T. Thus, when control unit 70 of a base station 40 allocates a channel to a particular terminal T, control unit 70 knows beforehand which modulation types are allowed due to the interference situation.

The inputs to Network planning processor 110 include the locations of the base stations B and the terminals T; the particular antenna patterns employed; basic link parameters such as power densities available; and modulation sensitivities such as C/N and C/I requirements. In addition, in an FBA (Fixed Bandwidth Allocation) mode, the inputs include the capacities (bitrates) needed per terminal.

As the notion of modes has been broached above, it should be mentioned that the invention can operate in either of two modes of operation. In the FBA (Fixed Bandwidth Allocation) mode, each specific terminal is allocated a specific capacity (bitrate), modulation type, bandwidth and frequency once and for all. In the Dynamic Bandwidth Allocation (DBA) mode, each terminal is allocated a capacity, modulation type and bandwidth by controller 70 according to the actual need at every moment. In the DBA mode any terminal can change allocated frequency with time as the system tries to move the users to make optimum usage of the total bandwidth.

Mention is also often made herein to "modulation types". Five different examples of modulation types and corresponding characteristics are shown in Table I.

TABLE I

Example Modulation Types and Corresponding Characteristics

| Modulation Type | C/N | C/I | Efficiency | Relative range |
|---|---|---|---|---|
| QPSK ½ | 6.5 | 9.5 | 0.85 | 1 |
| QPSK ¾ | 9 | 12 | 1.30 | 0.75 |
| QPSK ⅞ | 11 | 14 | 1.50 | 0.60 |
| 8 TCM ⅔ | 11.5 | 14.5 | 1.70 | 0.55 |
| 16 TCM ¾ | 18 | 21 | 2.50 | 0.26 |

In Table I, the C/I ratio are the values for 3 dB degradation of the noise threshold. This difference is necessary in C/N and C/I is 11.5 dB for the two extremes. The bandwidth requirements are differing by a factor of 3 and the range by a factor of almost 4 between the most robust and the most bandwidth efficient modulation.

FIG. 4A and FIG. 4B show selected general operations or steps performed by Network planning processor 110 in accordance with the present invention. Prior to performance of the steps shown in FIG. 4A and FIG. 4B, it is assumed four preliminary steps have occurred.

As a first preliminary, the sites and the needed capacities in number of 64 kb/s lines per site are defined. As a second preliminary, the base station sites B are found by overall considerations of capacity and coverage. For selection of appropriate sites, use is made of line of sight (LOS) coverage diagrams in Network planning processor 110. The base station sites are sectorized and the different sectors are allocated different polarizations. As a third preliminary, terminal sites are allocated to the different base stations. As a fourth preliminary, rain zone and the requirements on unavailable time (UAT) and link quality are defined. Typical other link quality requirements are defined in ITU-T:s Rec G 821. For radio link calculations different rain zones are used, as also defined by ITU.

Assuming that the foregoing preliminaries have been performed, Network planning processor 110 executes the general steps shown in FIG. 4A and FIG. 4B. Execution begins with selection of a power strategy, as depicted by steps 400 and 402.

At step 400 a base station's transmit power density (i.e. power transmitted per Hz bandwidth) is selected to be constant for all bitrates and modulation types. This implies that all bitrates transmitted with one specific modulation type have the same range. However a more bandwidth effective modulation type will have a shorter range since it will be less robust [require a higher signal to noise ratio C/N or signal to noise and interference ratio C/(N+I)].

At step 402 the transmit power density of a terminal is selected to be constant for all bitrates and for all modulation types measured at the range limit of the respective modulation type. With decreasing distance from the terminal to its base station, the power density is decreased so that the power density received at the base is constant for all distances. The power density transmitted from the terminals and also received at the base will differ for the various modulation types with the difference in the C/(N+I) required for the respective modulation types.

In considering the power selection steps 400 and 402, a typical power density for a base station could be e.g., −60 dBm/Hz bandwidth for all modulation types. For a terminal, power density will vary depending on its distance to the base station, e.g., for a QPSK ½ modulated link the power density could be −70 dBm/Hz at the range limit and would then decrease with distance to result in a constant received power density at the base (the power density would typically decrease with 6 dB for half the distance). For a 16 TCM ¾ link, the power density would be 11.5 dB higher corresponding to the difference in C/I requirements for a 16 TCM terminal at the same range as a terminal using QPSK ½. This implies that the power density received at the base station would be 11.5 dB higher for the 16 TCM terminal.

At step 404, a maximum range is calculated for each of the various modulation types. At this calculation a 3 dB degradation of the noise threshold is allowed for interference from other links (this means in the C/(N+1) ratio that I=N). The coverage calculations of step 404 are straight forward calculations in microwave link technology which are understood by the person skilled in the art, and accordingly are not described here in further detail. Typical coverage ranges vary with frequency band. In 10.5 GHz, which is a typical band allocated by ITU for point to multipoint services, distances are around 10 km for modulation type QPSK ½ and shorter for the more sensitive modulation types, e.g., 2–3 km for 16 TCM ¾. In higher frequency bands, e.g. 18 and 26 GHz, ranges are shorter due to the attenuation effect of rain (which is higher with higher frequency). A special case could be that the cell radius is selected so small that all modulation types have enough range.

At step 406 the minimum bandwidth modulation type is allocated to each terminal in dependence on its range from the base station. Thus, depending on the range of the terminal sites, the different links are allocated a modulation scheme which complies with the maximum range for that modulation and which uses minimum bandwidth.

At step 408, for each terminal a calculation is performed of the C/I ratio, where C represents the desired signal from the own base station sector and I the interference from each other base station sector. The interference from all other (sector) base stations is calculated taking the polarizations, antenna patterns (these have diagrams for both copolar and cross polarizations) and assigned power density into account. These interferences are added together to obtain the "I" of the C/I ratio.

At step 410, for each terminal the calculated C/I is checked to determine if it is greater than the minimum required C/I. Here the C/I values that represent a 3 dB degradation of the noise threshold should be used to comply with the coverage calculation of step 404. If the required C/I is not satisfied when checked at step 410, for any terminal failing the check the next lower (more robust modulation type) is selected for that terminal (step 412). If a further check (step 414) whether the C/I ratio is greater than the minimum, it is determined that no modulation type will satisfy the condition and the terminal is designated at step 416 as a problem terminal to be handled separated (e.g., such a problem terminal could be denied service or allocated a separate frequency from the total available bandwidth).

As an example of the foregoing, suppose that at step 410 the C/I is calculated to be 13. Such C/I ratio is permissible if the selected modulation type is QPSK ½, which requires 9.5 dB. On the other hand, if the selected modulation type were 16 TCM ¾, which requires 21 dB, the nearest most robust modulation type compatible with C/I=13 dB would be QPSK ¾. Thus QPSK ¾ would be selected instead of 16 TCM ¾. In connection with step 412, it should be noted that a change from one modulation type to another will not affect the C/I calculations just performed as all modulation types are transmitted with the same power density.

At step 418 (see FIG. 4B) the C/I ratios at the base stations are calculated (i.e., C/I calculations are made from each terminal to its base). For each terminal, the desired signal C is compared to the received interference signals I from other terminals. Note here that within each sector only one terminal will work on a specific frequency. Thus one link at the base station will only be interfered by a maximum of one terminal in each sector. With normal cell plans it is not likely that more than two terminals will contribute significantly to the interference. Thus it will be sufficient as a worst case to add a 3 dB margin to the interference level from the worst terminal.

At step 420 a check is made at the base station whether the received interference power density is below this maximum for each terminal. If not, at step 422 the terminal is allocated the next more robust modulation type, which will mean that the terminal will decrease its transmit power density. After a further check for such terminal at step 424, any terminal that can not be made to satisfy the condition on maximum interference power is marked as a problem terminal (step 426) and is treated separately as described above.

The present invention does not lead to a large number of calculations. By observing that (1) the received desired signal C from each terminal is constant for a specific modulation type (see step 402), and (2) that the difference in received signal level for the various modulation types correspond to the difference in required ratio C/I, it can be derived that the maximum allowed interference level is constant for all modulation types.

In connection with even numbered steps 418 through 426, it is to be noted that the wanted signal at a base station is always received with the same level for each specific modulation type. For a 16 TCM ¾ modulated link, however, the received level is 11.5 dB higher than for a QPSK ½ modulated link. As the allowed carrier to interference ratio C/I for the 16 TCM ¾ link is 11.5 dB higher than for the QPSK link, it can be concluded that the maximum allowed interference level is the same for all modulation types. Thus, in order to check the C/I for the uplink from the terminals to the base stations, it is sufficient to calculate the received interference signal at the base station. For example, if the nominal wanted signal C at the base is −140 dBm/Hz for a QPSK ½ link, the maximum interference signal level would be −140−9.5=−149.5 dBm/Hz for all modulation types. Thus, if the calculated interference signal level from terminal T2 is were −145 dBm/Hz, it would have to be reduced. It the modulation type for terminal T2 were e.g., 16 TCM ¾, the interference level could be reduced by selecting a more robust modulation type, which would have a lower power density at the same range. To be not higher that the maximum −149.5 dBm/Hz the interference signal level must be reduced by 4.5 dB. This could be done by selecting the modulation 8 TCM ⅔, which would reduce the interference level by 6.5 dB (decoupling by modulation type). If it would not be possible to find a more robust modulation that reduces the interference level enough, the terminal would be marked as a problem terminal (step 426) and could, e.g., be allocated a special frequency band, not used in the interfering sector (decoupling by frequency).

A special problem for the uplink (terminal to base) is that terminals from different sectors may add interference signals and it is difficult to know which terminals contribute (work on the same frequencies). This is typical for the DBA mode. However, it is not likely that more than two terminals will contribute simultaneously. Thus by using a 3 dB margin in the maximum allowed interference level the problem will be taken into account. Moreover, instead of using the FIG. −149.5 dBm/Hz as the maximum allowed interference signal level, the FIG. −152.5 dBm/Hz should be used.

Upon completion of either steps 420 or 424, the bitrate and modulation type for each terminal is be clear. Then, at step 428, when in the FBA mode, a specific frequency and bandwidth is allocated to each link, allowing for appropriate guardbands between the links. The links should basically be packed from narrow to broader channels. It should be understood that step 428 is executed only for the FBA mode. For the DBA mode the allocation of bitrate, modulation type and bandwidth is done momentarily by the control unit 70 in the sector.

At step 430 it is determined whether a new terminal is to be added to the system. When adding a new terminal to the system, steps 432, 434, and 436 are executed. These steps are similar to operations discussed above, in that for the new terminal: (1) a modulation type is determined with regard to range [step 432], (2) the C/I is checked from all base station sectors and the modulation type adjusted if necessary [step 434], and, (3) the interference level is checked in each base station sector from the new terminal and the modulation type is adjusted if necessary to comply with the maximum allowed interference density at the base [step 436]. Network planning processor 210 can continue to operate in a loop awaiting additions of other terminals as shown in FIG. 4B.

The above-described operations and calculations of FIG. 4A and FIG. 4B are performed by Network planning processor 110 and the results thereof passed to control units 70 of the various base stations. In the DBA mode, for each terminal the highest possible modulation type is specified. It is then up to the control units 70 to decide the actual modulation, bandwidth and frequency to use. The suggested highest possible modulation types are preferably inputted to control units 70 via the network management system 102.

Thus, the invention concerns a point to multipoint radio access system, comprising a number of sectorized base station sites and a number of subscriber terminals located within the coverage area of the base station sites. The radio links between subscriber terminals and base stations all work within the same frequency band. From sector to sector the base station antennas alternate between vertical and horizontal polarization in a systematic way to minimize the potential interference areas. In accordance with the invention, the links connecting a base station site to the subscriber terminals can be allocated differing capacities and differing modulation schemes selected from a number of choices. Of the modulation schemes, the most robust scheme corresponds to the widest bandwidth needed for a specific bitrate and also to the largest range possible. The least robust modulation scheme corresponds to the most narrow bandwidth needed for a specific bitrate and also the minimum possible range.

Characteristics of the system and method thus include the following:

(1) the base stations transmit with constant power density for all specific modulation types.

(2) the terminals transmit with constant power density for all bitrates and for all modulation types measured at the range limit of the respective modulation type and decrease the power density with decreasing range to the base station so that the power density received at the base station is constant for all distances for a specific modulation type;

(3) at a given range the transmitted power density from a terminal will differ for different modulation types corresponding to the differences in C/(N+I); and (4) the individual links to the terminals are designated a modulation type that is consistent with its range to the base station, the C/(N+I) from the various base stations and a maximum allowed interference level received at the base stations which is consistent with the required C/(N+I) and which occupies the least bandwidth.

Thus, the present invention advantageously provides a simple method to allocate modulation type, power strategy and bandwidth to each radio link in a point to multipoint system including the feature of allowing for various modulation types, considering the required coverage range, the minimum bandwidth requirement and the foreseen interference situation. The operation and allocation of the present invention is without undue consideration of other links, which could easily lead into countless iterations back and force before a satisfactory solution is achieved. The present invention also facilitates a system with dynamic channel allocation.

While the invention has been particularly shown and described with reference to the preferred embodiments thereof, it will be understood by those skilled in the art that various alterations in form and detail may be made therein without departing from the spirit and scope of the invention. For example, the polarization scheme for the antennas need not necessarily systematically alternate by sector between vertical and horizontal polarization. Moreover, the radio links can operate in more than one frequency band, e.g., two frequency bands.

The embodiments of the invention in which an exclusive property or privilege is claimed are defined as follows:

1. A method of allocating radio link characteristics in a point to multipoint radio access system, the point to multipoint radio access system comprising a number of base stations including a selected base station connected by a plurality of radio links to a corresponding plurality of subscriber terminals located within respective coverage areas of the selected base station, at least some of the plurality of radio links being within a same frequency band, the method comprising:

for the selected base station, selecting a base station power density which, for each of a plurality of modulation types, is constant for all bitrates;

for each of the plurality of subscriber terminals located within the coverage area of the selected base station, selecting a terminal power density which, for each of the plurality of modulation types, is constant for all bitrates;

determining a maximum range for each of the plurality of modulation types;

for each of the plurality of subscriber terminals, allocating a modulation type to the corresponding radio link dependent upon range from the selected base station;

determining, for each of the plurality of subscriber terminals, whether at the subscriber terminal there is an acceptable signal quality and, if not, allocating a next lower modulation type to the radio link corresponding to the subscriber terminal which does not have the acceptable signal quality; and determining at the selected base station whether there is an acceptable signal quality with respect to each of the plurality of subscriber terminals and, if not, allocating a next lower modulation type to the radio link corresponding to the subscriber terminal with respect to which there is not the acceptable signal quality.

2. The method of claim 1, further comprising allocating frequencies within the same frequency band and bandwidth to each of the plurality of radio links.

3. The method of claim 1, wherein the acceptable signal quality is indicated by a signal to noise and interference ratio (C/(N+I)).

4. The method of claim 1, wherein for all modulation types there is constant power density for all bitrates measured at range limits of the respective modulation types, wherein the power density decreases with decreasing range to the selected base station whereby the power density received at the selected base station is constant for all distances for a specific modulation type, at a given range the transmitted power density from the selected subscriber terminal differing for different modulation types in accordance with corresponding differences in the signal quality.

5. The method of claim 1, wherein a most robust modulation type corresponds to a widest bandwidth needed for a specific bitrate and also to a largest range possible, and a least robust modulation type corresponds to a most narrow bandwidth needed for a specific bitrate and also a minimum possible range.

6. The method of claim 1, wherein the base stations are provided with antennas which systematically alternate by sector between vertical and horizontal polarization to minimize potential interference.

\* \* \* \* \*